(No Model.)

C. H. ANDRUS.
CAR COUPLING.

No. 522,095. Patented June 26, 1894.

Witnesses  
Charles H. Andrus, Inventor  
By Attorney

UNITED STATES PATENT OFFICE.

CHARLES H. ANDRUS, OF PHILADELPHIA, PENNSYLVANIA.

CAR-COUPLING.

SPECIFICATION forming part of Letters Patent No. 522,095, dated June 26, 1894.

Application filed February 23, 1894. Serial No. 501,126. (No model.)

*To all whom it may concern:*

Be it known that I, CHARLES H. ANDRUS, a citizen of the United States, residing at Philadelphia, county of Philadelphia, State of Pennsylvania, have invented certain Improvements in Car-Couplers, of which the following is a specification.

My invention relates to improvements in automatic car couplers and my object is to provide a coupler which will consist of but few parts simple and strong in construction and effective in operation under all conditions of service.

The invention is fully described in connection with the accompanying drawings and is specifically pointed out in the claims.

Figure 1:
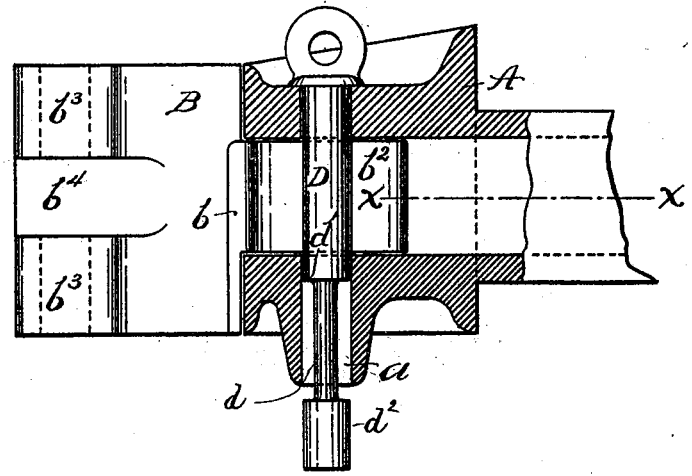
Figure 2:
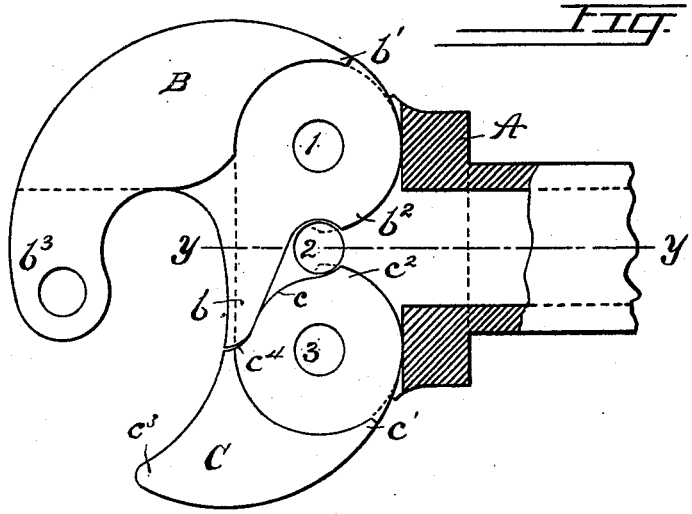

Figure 1 is an elevation of a portion of a coupling illustrating my invention, the drawhead being shown in section on line Y Y Fig. 2 with the coupling jaw and pin in position. Fig. 2 is a plan view of the same showing the drawhead in section on line X X Fig. 1 and all the parts in coupled position.

A represents the drawhead the jaw of which is extended laterally so as to receive the separately formed automatic coupling jaw B and coupling lever C which are pivoted to the drawhead at points marked 1 and 3 respectively, located in line with the center hole 2 for the coupling pin.

The coupling jaw B has its hooked forward end $b^3$ provided with a slot $b^4$ and pin holes to permit the use of the ordinary link coupling when necessary. Its shank or inner portion near the pivot 1 is recessed to form a projection $b^2$ adapted to engage the coupling pin when the latter is in place in the hole 2 so as to prevent a spreading movement of the hooked forward end $b^3$. It is also provided with a stop $b'$ which is adapted to limit this spreading movement when the coupling pin is raised, and with an arm $b$ located at the rear of the hook $b^3$ and against which the corresponding hook of another car will push as hereinafter explained.

The coupling lever C is recessed at its inner end to form a projection $c^2$ corresponding with the projection $b^2$ on the coupling jaw B and adapted to engage the coupling pin in the same manner; and also has a stop $c'$ to limit its spreading movement when the pin is not in place. The arm $b$ of the coupling jaw B rests in a seat $c^4$ formed in the lever C when the parts are in their normal position as shown in the drawings.

The coupling pin is preferably made as indicated in the drawings, with a reduced portion $d$ intermediate between the main body and the lower guide portion $d^2$. This reduced portion is of somewhat greater length than the height of the draw head opening. When set for coupling the pin is raised until the shoulder $d'$ rests upon the projections $b^2$ and $c^2$ of the coupling jaw and lever respectively, these being moved to the position indicated by dotted lines in Fig. 2 which is permitted by the reduced section $d$ of the pin. The coupling jaw of an approaching car first strikes the front end $c^3$ of the lever C thus tending to turn the latter outward on the pivot 3 which motion will be transmitted also to the coupling jaw through the arm $b$ which is moved forward by contact with the surface $c$ of the lever. The hooked end $b^3$ of the approaching car having been guided into coupling position by the lever C, strikes against the arm $b$ thus swinging the lever and jaw toward each other in front and spreading them at the rear so as to allow the coupling pin to automatically drop thus locking the parts in the coupled position indicated.

By employing the preferred form of pin shown I am enabled to firmly support and guide the pin when it is raised preparatory to coupling, the lower guide portion $d^2$ being then within the hole $a$ of the drawhead. It is not however essential to the operation of my coupling.

The great simplicity of construction and operation of my coupler is evident as is also its perfect adaptability to varying heights of cars and curvatures of tracks. I do not desire to confine myself however to the exact construction indicated in the drawings which may be modified without departing from the spirit of my invention.

What I claim is—

1. A draw head having a coupling jaw and coupling lever separately pivoted thereto and a coupling pin engaging both jaw and lever to lock the same, substantially as set forth.

2. The combination with the draw head of a coupling jaw and coupling lever separately pivoted thereto, and a coupling pin, said jaw and lever being arranged to engage each other and to jointly engage said coupling pin, substantially as set forth.

3. The combination with the draw head of a coupling jaw and coupling lever separately pivoted thereto at points 1 and 3 respectively, and a coupling pin located between said pivotal points, said jaw being provided with an arm $b$ and both jaw and lever having corresponding projections $b^2$ and $c^2$ to engage said pin, substantially as set forth.

4. The combination with the draw head of a coupling jaw and coupling lever separately pivoted thereto, and a coupling pin, said jaw and lever being arranged to engage each other and to jointly engage said coupling pin and being provided with stops as $b'$ and $c'$ to limit their movement when said pin is withdrawn, substantially as set forth.

5. The combination with a drawhead having a coupling jaw B and a coupling lever C pivoted thereto, of a coupling pin adapted to lock said jaw and lever and having a reduced section intermediate of its length, and an enlarged lower end adapted to fit the hole in the drawhead, substantially as and for the purpose set forth.

In testimony whereof I affix my signature in presence of two witnesses.

CHARLES H. ANDRUS.

Witnesses:
L. J. DOUGHERTY,
JAMES C. JOHNSON.